United States Patent [19]

Hollins

[11] 3,798,994
[45] Mar. 26, 1974

[54] APPARATUS FOR PROTECTING THE DRIVER OF A VEHICLE

[76] Inventor: Jesse R. Hollins, 1 Chester Dr., Great Neck, N.Y. 11021

[22] Filed: Nov. 1, 1971

[21] Appl. No.: 194,662

[52] U.S. Cl..................... 74/492, 180/90, 280/87 R
[51] Int. Cl.............................................. B62d 1/18
[58] Field of Search............ 280/87 R, 87 A, 150 B; 180/90; 74/492, 493

[56] References Cited
UNITED STATES PATENTS

| | | | |
|---|---|---|---|
| 3,507,164 | 4/1970 | Wilfert................................. | 74/492 |
| 3,460,400 | 8/1969 | Kubokawa........................... | 74/492 |
| 2,091,059 | 8/1937 | Jjaarda................................. | 180/90 |
| 1,999,429 | 4/1935 | Tibbetts............................... | 180/90 |

Primary Examiner—Gerald M. Forlenza
Assistant Examiner—Richard A. Bertsch

[57] ABSTRACT

Apparatus for protecting a driver of a vehicle. The apparatus includes a steering wheel, a padded cushion positioned between the steering wheel and an instrument panel of the vehicle, and means for enabling the steering wheel to move towards the cushion so that the steering wheel sinks into the cushion when the body of the driver is thrust against the steering wheel, or when more than normal pressure is applied to the steering wheel. The cushion will then serve to brace the body of the driver and protect him from injury, while also protecting the steering wheel and mechanism from being damaged.

9 Claims, 6 Drawing Figures

PATENTED MAR 26 1974 3,798,994

INVENTOR.
JESSE R. HOLLINS
BY

PATENTED MAR 26 1974 3,798,994
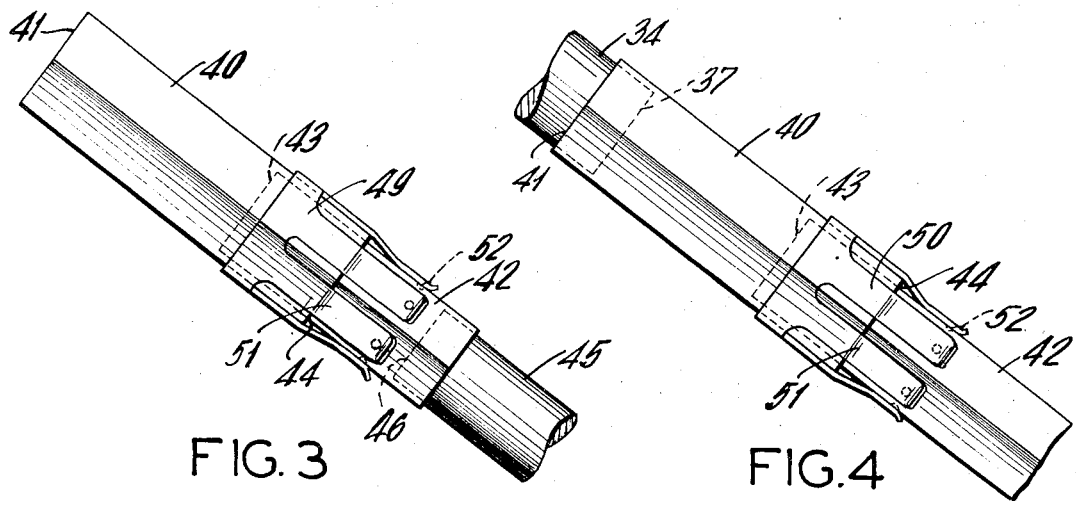
FIG. 3
FIG. 4
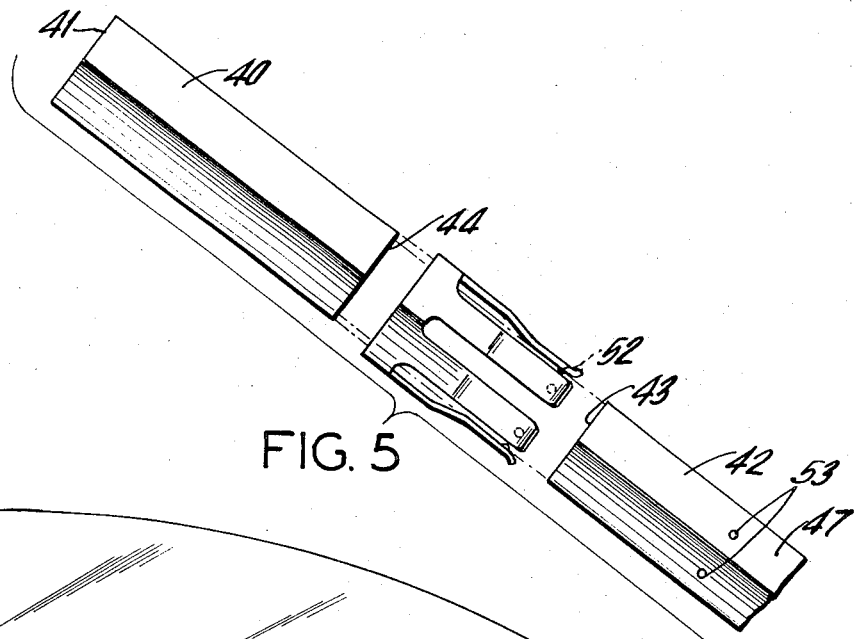
FIG. 5
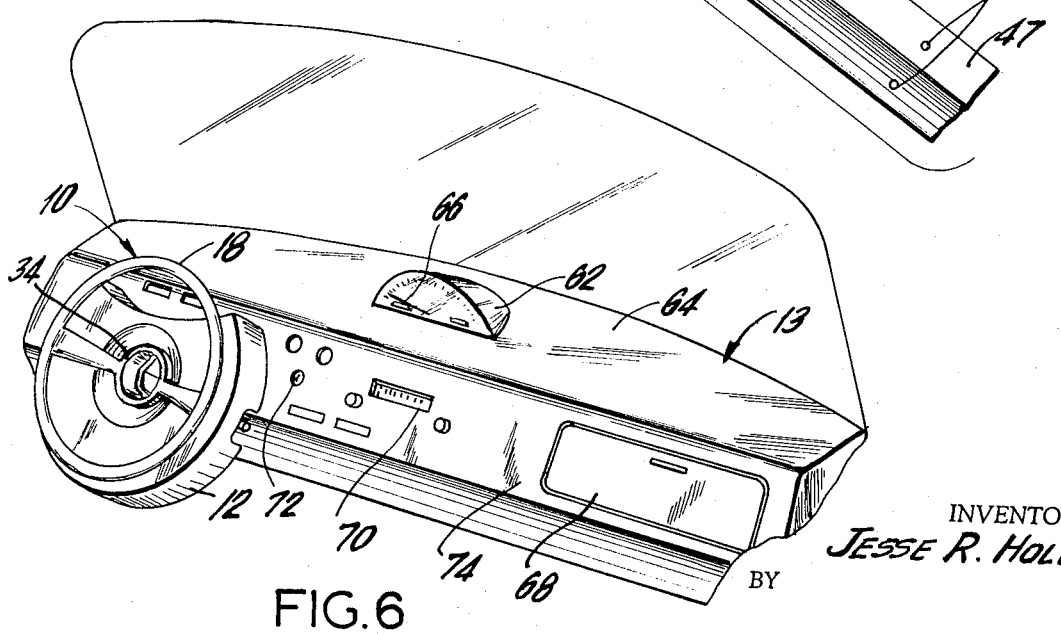
FIG. 6
INVENTOR.
JESSE R. HOLLINS
BY

APPARATUS FOR PROTECTING THE DRIVER OF A VEHICLE

CROSS-REFERENCE TO RELATED APPLICATIONS

This invention relates to my co-pending U.S. Pat. applications Ser. No. 187,286 filed on Oct. 7, 1971 for AN ASSEMBLY FOR PROTECTING A PASSENGER OF A VEHICLE; and U.S. Pat. No. 189,650 filed on Oct. 15, 1971 for MOTORIZED RETRACTABLE PADDED CUSHION.

BACKGROUND OF THE INVENTION

1. Field of the Invention

This invention relates to an apparatus for protecting a driver of a vehicle and more particularly to a steering column assembly for protecting both the driver and the steering wheel and mechanism from injury in the event of an accident.

This invention also relates to locating the speedometer in a more convenient position on the instrument panel of the vehicle.

2. Description of the Prior Art

The most frequently used means for protecting the occupant of a vehicle is a seat belt. Unfortunately, most vehicle occupants tend to neglect to fasten their seat belt, thus the seat belt does not always render protective service.

To compensate for the lack of use of the current seat belts, the installation of air bags in vehicles is being considered. The air bag is supposed to be designed so that it will inflate immediately upon the sensing of a predetermined force of impact upon the vehicle. As the air bag inflates to its material size, its position should be between the occupant of the vehicle and the instrument panel and windshield area. The speed and force with which the gas must fill the bag creates a sound so loud that permanent damage to the occupant's eardrums may result, especially if the windows of the vehicle are closed. The sudden impact of the inflated bag on the occupant's body, especially his head, can result in severe physical damage to him. Timing the inflation of the bag prior to the movement of the occupant during the momentary period of the accident is unpredictable and uncontrollable thus its safety value is questionable. There is no assurance that the bag will not unnecessarily inflate when there is merely a sharp and sudden jolt of the vehicle, which often happens when the vehicle's wheels encounter a hole (pothole) in the roadway. Sudden deceleration and stopping of the vehicle is often necessary in order to prevent an accident, which deceleration or stopping causes the occupant to be thrown forward from his seated position, and since there is no vehicle impact, the air bag does not inflate, thus it does not protect the occupant. Since the air bag and its triggering mechanism remain dormant unless the vehicle is involved in a severe accident, these is no assurance that the air bag mechanism will function when needed. As the air bag mechanism cannot be tested upon being installed and periodic testing cannot be made, there is no positive assurance that the air bag system will ever function. The installation of an air bag, its triggering and inflating mechanism, are costly to produce and install, even when the installation is made during the assembly of the vehicle. Once the air bag is inflated, its life being ended and the gas in the cylinder having escaped, a new bag and a fully charged cylinder are required, necessitating their installation and connection in order to re-establish the air bag system. At present, air bag installation is considered only for protection of the passenger occupant of the front seat of the vehicle.

A solution to the above described problems has been suggested in my co-pending U.S. Pat. applications Ser. No. 187,286 filed on Oct. 7, 1971, for AN ASSEMBLY FOR PROTECTING A PASSENGER OF A VEHICLE wherein there is described a padded cushion which is hinge-mounted to the instrument panel, said padded cushion being manually movable from its vertical to its horizontal position and vice versa; and U.S. Pat. Ser. No. 189,650 filed on Oct. 15, 1971 for a MOTORIZED RETRACTABLE PADDED CUSHION wherein there is described a padded cushion which is automatically moved between an extended horizontal position and a retracted position. The embodiments in these co-pending patent applications, however, do not protect the driver of the vehicle when he is thrust forward due to impact during a collision. Not only will the driver of the vehicle be injured when he is thrust against the steering wheel, but there is a possibility that such an occurrence will result in damage to the steering column assembly and other parts of the steering mechanism, which damage may disable the vehicle.

Another problem relating to currently operated vehicles concerns the location of the speedometer on the side of the instrument panel facing the driver. Such a location of the instrument panel causes the driver to move his eyes from viewing the road ahead of the vehicle to a position below the windshield of the vehicle to view the speedometer markings and the associated indicator needle. Since the driver cannot view the road and the traffic conditions ahead of him while at the same time viewing the speedometer, he may decide not to view the speedometer at all, or only view the speedometer very rarely. Very often when traveling on modern highways, due to his inability to quickly glance at the speedometer, the driver operates the vehicle at speeds which exceed the designated speed limits.

SUMMARY OF THE INVENTION

1. Purpose of the Invention

It is an object of this invention to provide an effective and convenient system for protecting the driver of a vehicle.

It is still another object of this invention to provide for a steering column assembly which will avoid being damaged in the event of the driver being thrust against the steering wheel.

It is still another object of this invention to provide for a more convenient location for the speedometer.

Other objects of the invention will in part be obvious and in part be pointed out hereinafter.

2. Brief Description of the Invention

According to a broad aspect of the invention, there is provided an apparatus for protecting a driver of a vehicle, said apparatus comprising a steering wheel, a padded cushion positioned between said steering wheel and an instrument panel of the vehicle, and means for enabling said steering wheel to move towards said cushion so that said steering wheel sinks into said cushion when sufficient force is applied against said steering wheel, and permitting said steering wheel to be reset to its normal operating position.

A feature of this invention provides that the moving means is a steering column assembly coupled to the steering wheel.

A further feature of the invention provides that the steering column assembly include a first round steering tube coupled to said steering wheel and a second round steering tube coupled to a steering mechanism, an outer tube positioned within and attached to said first round steering tube, an inner tube positioned over and attached to said second round steering tube and a portion of said inner tube being positioned within said outer tube, whereby a movement of rotation of the outer tube causes a movement of rotation of the inner tube, and means coupled to said inner and outer tubes for preventing said outer tube from moving in relation to said inner tube in the absence of force being applied to said steering wheel and for allowing said outer tube to move in relation to said inner tube when sufficient force is applied to said steering wheel, whereby said steering wheel, which is coupled to said steering column assembly, sinks into said padded cushion.

A still further feature of the invention provides that the steering column assembly include a round steering tube coupled to said steering wheel, an outer tube positioned within and attached to said round steering tube, an inner tube coupled to a steering mechanism and a portion of said inner tube being positioned within said outer tube, and means coupled to said inner and outer tubes for preventing said outer tube from moving in relation to said inner tube in the absence of force being applied to said steering wheel, and for allowing said outer tube to move in relation to said inner tube when sufficient force is applied to said steering wheel, whereby said steering wheel, which is coupled to said steering column assembly, sinks into said padded cushion.

In another feature of the invention, the steering column assembly includes a round steering tube coupled to a steering mechanism, an outer tube coupled to said steering wheel, an inner tube positioned over and attached to said round steering tube and a portion of said inner tube being positioned within said outer tube, and means coupled to said inner and outer tubes for preventing said outer tube from moving in relation to said inner tube in the absence of force being applied to said steering wheel, and for allowing said outer tube to move in relation to said inner tube when sufficient force is applied to said steering wheel, whereby said steering wheel, which is coupled to said steering column assembly, sinks into said padded cushion.

In still another feature of the invention, the steering column assembly includes an outer tube coupled to said steering wheel, an inner tube coupled to a steering mechanism and a portion of said inner tube being positioned within said outer tube, and means coupled to said inner and outer tubes for preventing said outer tube from moving in relation to said inner tube in the absence of force being applied to said steering wheel, and for allowing said outer tube to move in relation to said inner tube when sufficient force is applied to said steering wheel, whereby said steering wheel, which is coupled to said steering column assembly, sinks into said padded cushion.

In a further feature of the invention, the inner and outer tubes have a hexagonal shape and the preventing and allowing means is comprised of a hexagonally shaped gripping spring, or a multiple of formed spring fingers.

In still a further feature of the invention the gripping spring fingers are comprised of a solid portion having a multiple of sections and a finger extending from each section, the solid portion thereof and a portion of each said finger proximal to said solid portion being fastened to said outer tube, and the remaining portion of each said finger distal from said solid portion gripping said inner tube.

An additional feature of the invention provdes that the inner tube has an indentation on each hexagonal surface and each spring finger has a protrusion aligned with the indentation in the corresponding side of said inner tube for preventing said outer tube from moving in relation to said inner tube, unless sufficient force is applied thereto when excessive pressure is applied to said steering wheel.

In still an additional feature of the invention the speedometer is located at the back of the top ledge of the instrument panel in front of the windshield and at a position approximately midway between the right and left sides of the vehicle so as not to obstruct the driver's view of the road and so as to make it more convenient for the driver to glance at the speedometer.

BRIEF DESCRIPTION OF THE DRAWINGS

In the accompanying drawings in which are shown various possible embodiments of my invention.

FIG. 3 is another embodiment of the section of the steering column assembly wherein a hexagonal tube will be coupled to the steering wheel and a round tube will be coupled to the steering mechanism;

FIG. 4 is another embodiment of a steering column assembly wherein a round tube will be coupled to the steering wheel and a hexagonal tube will be coupled to the steering mechanism;

FIG. 5 is an exploded view of another embodiment of the steering column assembly wherein a first hexagonal tube is coupled to the steering wheel and a second hexagonal tube is coupled to the steering mechanism; and FIG. 6 is a plan view of the instrument panel of the vehicle showing the location of the speedometer relative to the location of the steering wheel and padded cushion.

DESCRIPTION OF THE PREFERRED EMBODIMENTS

Figure 1:
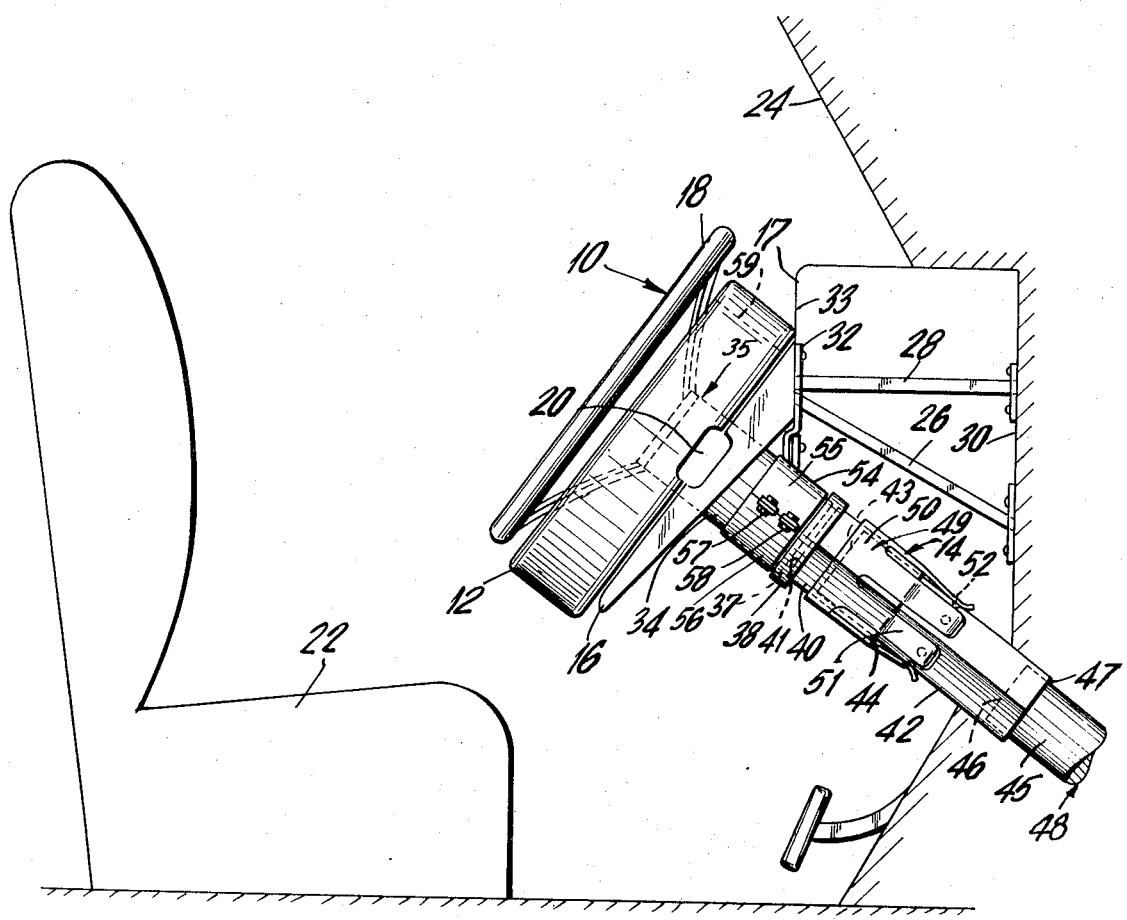
FIG. 1 is a side view of one embodiment of the invention showing a steering column assembly, padded cushion, and steering wheel.

A side view of the apparatus for protecting the driver of a vehicle is shown in FIG. 1. The apparatus consists of a standard type steering wheel 10, a padded cushion 12 positioned between steering wheel 10 and an instrument panel 13 of the vehicle, and a telescoping steering column assembly 14, one end of which is coupled to steering wheel 10 and the other end of which is coupled to a steering mechanism (not shown). Padded cushion 12 can be comprised of material such as foam rubber or other available compressible material, and can be contained within a cover of plastic, leather or fabric. A rigid supporting member 16 is positioned underneath or behind the padded cushion and is fastened to a section 17 of instrument panel 13. Support member 16 serves to prevent any downward movement in cushion 12. As shown in FIG. 1, a clear area 20 can be provided within cushion 12 and support member 16 for a transmission shifting lever. Cushion 12 is located sufficiently behind a rim 18 of steering wheel 10 so as not to interfere with the fingers of the driver when the driver is gripping the wheel. For example, approximately a 2 inches clearance is considered practical. The driver, of course, will be seated in front of steering wheel 10 in seat 22, and instrument panel 13 is located between steering wheel 10 and windshield 24 of the vehicle. Braces 26 and 28 are attached to a fire wall 30 of the vehicle and also to a bracket 32 located on an interior surface 33 of section 17 of instrument panel 13.

Figure 2:
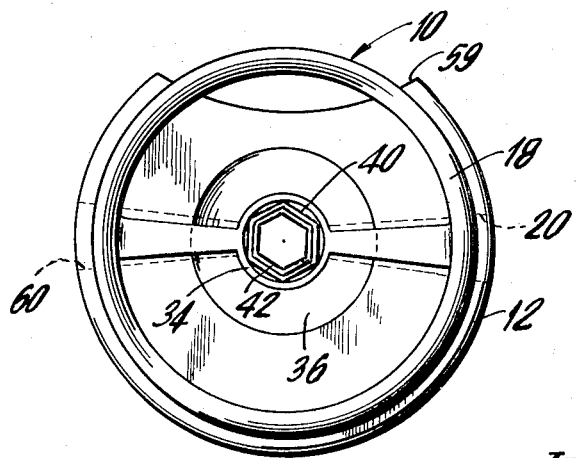
FIG. 2 is a top view of the steering wheel and padded cushion.

Means for moving steering wheel 10 towards cushion 12 so that steering wheel 10 sinks into cushion 12 when the body of the driver is thrust against steering wheel 10 or excessive force is applied thereto, and for resetting steering wheel 10 to its normal operating position, is provided by steering column assembly 14. Steering column assembly 14 in this embodiment includes a round tube 34 which has one end 35 attached to a steering wheel hub 36, as shown in FIG. 2. The other end 37 of round tube 34 is positioned and fastened within a hole in a steering column collar 38. A hexagonally shaped outer tube 40 also can have one end 41 positioned and fastened within the hole in steering column collar 38, or outer tube 40 can fit within and be fastened to tube 34. A hexagonally shaped inner tube 42 will have one end 43 fit within and telescopically engage the other end 44 of tube 40, whereby a movement of rotation of outer tube 40 causes a corresponding rotation of inner tube 42. It should be noted that outer and inner tubes 40 and 42 can hape shapes other than hexagonal as long as the movement of rotation of one of tubes 40 and 42 causes a corresponding rotation in the other tube. Another round tube or bar 45 can have one end 46 fit within and fastened to the other end 47 of inner tube 42. The other end 48 of round tube or bar 45 is attached to the steering mechanism (gear) or the power steering mechanism.

Means coupled to respective inner and outer tubes 42 and 40 for preventing the outer tube from moving in relation to the inner tube in the absence of force being applied to the steering wheel, and for allowing the outer tube to move in relation to the inner tube when sufficient force is applied to the steering wheel is provided by spring-loaded gripping spring fingers 49. Gripping spring fingers 49 have a solid portion 50 fastened to each or some of the faces of outer tube 40 with their spring-loaded fingers 51 extending along and gripping the sides of inner tube 42. Each finger has an inwardly protruding portion 52 wherein the protruding portion is aligned with an indentation 53 (shown in FIG. 5) in inner tube 42. Gripping spring fingers 49 thus prevent outer tube 42 from moving down onto and in relation to inner tube 40 unless sufficient force is applied to steering column assembly 14 when the body of the driver is thrust against steering wheel 10, or when more than normal pressure is applied to steering wheel 10. When sufficient force (determined by design requirements) is applied to steering wheel 10, protruding portions 52 of gripping spring fingers 49 are forced out of their respective indentations 53 so as to allow outer tube 40 to slide down and over inner tube 42 until steering wheel 10 sinks into padded cushion 12.

Bracket 32 is attached to and supports a tube support collar 54 which collar has first and second respective sections 55 and 56. Steering tube 34 passes through a hole formed by sections 55 and 56 of collar 54, and is surrounded by support collar 54 when sections 55 and 56 are fastened together via bolts 57 and 58. Support collar 54 therefore serves to actually support steering column assembly 14 while allowing outer tube 40 to rotate and to slide down or up. Since steering column collar 38 cannot move past support collar 54, the uppermost position of steering wheel 10 is fixed when steering column collar 38 abuts support collar 54.

As shown in FIG. 2, the outer diameter of steering wheel 10 is less than the outer diameter of padded cushion 12 so as to assure that steering wheel 10 will sink into cushion 12. It should be noted that the top portion 59 of padded cushion 12 may be cut away if desired. It should also be noted that cushion 12 can be provided with a clear area 60 (shown in dotted lines in FIG. 2) to allow clearance for a directional signal switch lever.

An alternate steering column assembly is shown in FIG. 3 wherein round steering tube 34 is omitted and end 41 of outer tube 40 is directly attached to steering wheel hub 36 (shown in FIG. 2).

In another embodiment of steering column assembly 14 (shown in FIG. 4) round tube 45 is omitted and the other end 47 of inner tube 42 is directly attached to the steering mechanism.

In a still further embodiment of steering column assembly 14 (shown in FIG. 5) round tubes 34 and 44 are both omitted and the respective ends 41 and 47 of tubes 40 and 42 are attached respectively to steering wheel 10 and the steering mechanism.

Since the above steering column assembly allows steering wheel 10 to safely sink within cushion 12 when excessive force is applied to steering wheel 10, the chance of the driver being injured by the steering wheel is reduced, and the steering column assembly and steering mechanism will again be operable when steering wheel 10 is reset in its operating position.

Since in order to obtain maximum protection for the driver, padded cushion 12 is positioned below and behind the steering wheel of the vehicle, it thus may tend to obstruct the driver's ability to view the speedometer. In view of this and for reasons described in the Background of the Invention, speedometer 62 has been positioned (as shown in FIG. 6) on top of ledge 64 of instrument panel 13. More specifically, speedometer 62 can be positioned towards the back of ledge 64 and approximately centered between the right and left sides of the vehicle. Furthermore, face 66 of the speedometer 62 should be perpendicular to the line of sight of the driver so as to avoid any peripheral error in reading the speedometer, although the speedometer may be set in another position if desired.

In this new position, the speedometer is so placed as not to obstruct the driver's view of the road or the traffic in front of the vehicle, while it also allows him to more frequently glance at the speedometer so that he may more conveniently control the driving speed and thus operate the vehicle in an increasingly safe manner.

It should be noted that glove compartment 68, radio 70, ignition switch 72, and other instruments which are located on the face 74 of instrument panel 13 can all be located in any position in accordance with the design of the particular instrument panel of any vehicle.

It is thus seen that there is provided an apparatus for protecting a driver of a vehicle which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described there is invention, thereis claimed as new and is desired to be secured by Letters Patent:

1. Apparatus for protecting a driver of a vehicle comprising a steering wheel, a stationary padded cushion positioned between said steering wheel and an instrument panel of the vehicle, said steering wheel having a normal operating position spaced from said padded cushion, means for enabling said steering wheel to move towards said padded cushion so that said steering wheel sinks into said padded cushion when a driver is thrust against said steering wheel or excessive force is applied to said steering wheel and permitting said steering wheel to be reset to its normal operating position, said moving and resetting means including a telescoping steering column assembly coupled to said steering wheel, said steering column assembly including a first round steering tube coupled to said steering wheel and a second round steering tube coupled to a steering mechanism, an outer tube, means coupling said outer tube to said first round steering tube so that said outer tube and said first round steering tube rotate and move axially together, an inner tube positioned about and attached to said second round steering tube and a portion thereof being telescopically received within said outer tube, whereby rotation of said outer tube causes a corresponding rotation of said inner tube, means coupled to said inner and outer tubes for preventing said outer tube from moving axially in relation to said inner tube in the absence of force being applied to said steering wheel and for allowing said outer tube to axially move in relation to said inner tube when sufficient force is applied against said steering wheel whereby said steering wheel sinks into said padded cushion.

2. Apparatus according to claim 1 wherein said coupling means includes a steering column collar secured to said outer tube and said first round steering tube, a support collar attached to the instrument panel and surrounding a portion of said first round steering tube and fixing the uppermost position of said steering wheel when said steering column collar abuts said support column.

3. Apparatus according to claim 1 wherein said outer and inner tubes have a hexagonal shape, and said preventing and allowing means including a multiple of formed spring fingers fastened to said outer tube and gripping said inner tube.

4. Apparatus according to claim 3 wherein each spring finger includes a distal end which grips said inner tube.

5. Apparatus according to claim 3 wherein said inner tube has an indentation on each hexagonal surface, and each spring finger has a protrusion aligned with the indentation in the corresponding side of said inner tube for preventing said outer tube from moving in relation to said inner tube unless sufficient force is applied thereto.

6. Apparatus for protecting a driver of a vehicle comprising a steering wheel, a stationary padded cushion positioned between said steering wheel and an instrument panel of the vehicle, said steering wheel having a normal operating position spaced from said steering wheel, means for enabling said steering wheel to move towards said padded cushion so that said steering wheel sinks into said padded cushion when the driver is thrust against said steering wheel or excessive force is applied to said steering wheel and permitting said steering wheel to be reset to its normal operating position, said moving and resetting means including a telescoping steering column assembly coupled to said steering wheel, said steering column assembly including a round steering tube coupled to said steering wheel, an outer tube coupled to said round steering tube, an inner tube coupled to a steering mechanism and a portion of said inner tube being telescopically engaged within said outer tube whereby rotation of said outer tube causes a corresponding rotation of said inner tube, means coupled to said inner and outer tubes for preventing said outer tube from moving axially relative to said inner tube in the absence of force being applied to said steering wheel and for allowing said outer tube to move axially relative to said inner tube when sufficient force is applied against said steering wheel whereby said steering wheel sinks into said padded cushion.

7. Apparatus for protecting a driver of a vehicle comprising a steering wheel, a stationary padded cushion positioned between said steering wheel and an instrument panel of the vehicle, said steering wheel having a normal operating position spaced from said padded cushion, means for enabling said steering wheel to move towards said padded cushion so that said steering wheel sinks into said padded cushion when the driver is thrust against said steering wheel or excessive force is applied to said steering wheel and permitting said steering wheel to be reset to its normal operating position, said moving and resetting means including a telescoping steering column assembly coupled to said steering wheel, said steering column assembly including a round steering tube coupled to a steering mechanism, an outer tube coupled to said steering wheel, an inner tube positioned about and attached to said round steering tube and a portion of said inner tube being telescopically engaged within said outer tube, whereby a movement of rotation of said outer tube causes a corresponding rotation of said inner tube, means coupled to said inner and outer tubes for preventing said outer tube from moving axially in relation to said inner tube in the absence of force being applied against said steering wheel, and for allowing said outer tube to move axially in relation to said inner tube when sufficient force is applied against said steering wheel, whereby said steering wheel sinks into said padded cushion.

8. Apparatus for protecting a driver of a vehicle comprising a steering wheel, a stationary padded cushion positioned between said steering wheel and an instrument panel of the vehicle, said steering wheel having a normal operating position spaced from said padded cushion, means for enabling said steering wheel to move towards said padded cushion so that said steering wheel sinks into said padded cushion when the driver is thrust against said steering wheel or excessive force is applied to said steering wheel and permitting said steering wheel to be reset to its normal operating position, said moving and resetting means including a telescoping steering column assembly coupled to said steering wheel, said steering column assembly including an outer tube coupled to said steering wheel, an inner tube coupled to a steering mechanism and a portion of said inner tube being telescopically engaged within said outer tube, whereby a movement of rotation of said outer tube causes a corresponding rotation of said inner tube, means coupled to said inner and outer tubes for preventing said outer tube from moving axially in relation to said inner tube in the absence of force being applied to said steering wheel, and for allowing said outer tube to move axially in relation to said inner tube when sufficient force is applied against said steering wheel, whereby said steering wheel, which is coupled to said steering column assembly, sinks into said padded cushion.

9. Apparatus for protecting a driver of a vehicle comprising a steering wheel, a padded cushion positioned between said steering wheel and an instrument panel of the vehicle, means preventing said padded cushion from moving relative to said instrument panel, a first element coupled to said steering wheel, a second element coupled to a steering mechanism, and means telescopically connecting said first element to said second element so that said first and second elements rotate in unison and when less than a predetermined force is applied against said steering wheel said steering wheel and said first element do not move axially towards said second element and when more than a predetermined force is applied to said steering wheel said steering wheel and first element move axially towards said second element whereby said steering wheel sinks into said padded cushion.

* * * * *